(12) United States Patent
Dikshit et al.

(10) Patent No.: US 12,706,841 B2
(45) Date of Patent: Aug. 11, 2026

(54) FINE-GRAINED ROLE-BASED SEGMENTATION IN OVERLAY NETWORK

(71) Applicant: Hewlett Packard Enterprise Development LP, Spring, TX (US)

(72) Inventors: Saumya Dikshit, Bengaluru (IN); Balaji Sankaran, Bengaluru (IN); Badrish Havaralu Rama Chandra Adiga, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 145 days.

(21) Appl. No.: 18/347,459

(22) Filed: Jul. 5, 2023

(65) Prior Publication Data

US 2025/0016091 A1 Jan. 9, 2025

(51) Int. Cl.

| | |
|---|---|
| ***H04L 45/64*** | (2022.01) |
| ***H04L 12/46*** | (2006.01) |
| ***H04L 45/02*** | (2022.01) |
| ***H04L 45/74*** | (2022.01) |

(52) U.S. Cl.

CPC .......... *H04L 45/64* (2013.01); *H04L 12/4641* (2013.01); *H04L 45/02* (2013.01); *H04L 45/74* (2013.01)

(58) Field of Classification Search

CPC ......... H04L 45/08; H04L 45/64; H04L 45/76; H04L 2101/622; H04L 12/4633; H04L 12/4641; H04L 45/02; H04L 45/66; H04L 45/74; H04L 49/60; H04L 61/2592; H04L 69/22

See application file for complete search history.

(56) References Cited

U.S. PATENT DOCUMENTS

| | | | |
|---|---|---|---|
| 8,571,029 | B1 | 10/2013 | Aggarwal et al. |
| 9,912,614 | B2 | 3/2018 | Koganti |
| 10,560,379 | B1 | 2/2020 | Ghosh |

(Continued)

FOREIGN PATENT DOCUMENTS

| | | | |
|---|---|---|---|
| CN | 105790996 | A | 7/2016 |
| CN | 110391987 | A | 10/2019 |
| WO | 2019/105461 | A1 | 6/2019 |

OTHER PUBLICATIONS

A. Sajassi, Ed., "BGP MPLS-Based Ethernet VPN", Request for Comments: 7432, Feb. 2015, 56 pages.

(Continued)

*Primary Examiner* — Jianye Wu

(74) *Attorney, Agent, or Firm* — Yao Legal Services, Inc.

(57) ABSTRACT

A system for facilitating segmentation by a first switch of an overlay tunnel fabric is provided. During operation, the system can receive a route update packet for the fabric. The packet can be based on a control plane that allows the exchange of route information via the tunnel and can include a first media access control (MAC) address learned at a second switch and a first role identifier of a first role. The first role can indicate a level of access granted to a first device associated with the first MAC address. The system can store the first MAC address and the first role identifier in a local address data structure. Upon receiving a packet from the first device, the system can then determine, based on the first role identifier and a first segmentation policy, whether a local device is allowed to receive the packet from the first device.

20 Claims, 8 Drawing Sheets

(56) References Cited

U.S. PATENT DOCUMENTS

| | | | | |
|---|---|---|---|---|
| 11,374,862 | B2 | 6/2022 | Wang | |
| 2004/0059829 | A1 | 3/2004 | Chu et al. | |
| 2004/0215821 | A1 | 10/2004 | Regan et al. | |
| 2008/0092229 | A1 | 4/2008 | Khanna et al. | |
| 2008/0144627 | A1 * | 6/2008 | Ballantyne | H04L 45/02 370/392 |
| 2013/0142129 | A1 | 6/2013 | Rinne et al. | |
| 2016/0330125 | A1 | 11/2016 | Mekkattuparamban et al. | |
| 2017/0141963 | A1 | 5/2017 | Chalapathy et al. | |
| 2017/0155577 | A1 | 6/2017 | Zhang et al. | |
| 2017/0163569 | A1 | 6/2017 | Koganti | |
| 2019/0149463 | A1 | 5/2019 | Shenoy et al. | |
| 2020/0244566 | A1 | 7/2020 | Johnsen et al. | |
| 2024/0406102 | A1 * | 12/2024 | Dikshit | H04L 45/16 |

OTHER PUBLICATIONS

Aruba, “Switch > VSX,” retrieved Jul. 3, 2023, <https://www.arubanetworks.com/techdocs/central/2.5.3/content/switches/cx/switch-cx-vsx.htm>, 3 pages.

Aruba, “vsx-sync (config-vlan-if context),” retrieved Jul. 3, 2023, <https://www.arubanetworks.com/techdocs/AOS-CX/AOSCX-CLI-Bank/cli_8360/Content/VSX_cmds/vsx-syn-act-gat-pol-10.htm>, 2 pages.

Bates et al., “Multiprotocol Extensions for BGP-4”, Request for Comments: 4760, Jan. 2007, 12 pages.

Cisco, “IP-Prefix and SGT-Based SXP Filtering,” retrieved Jul. 3, 2023, 12 pages.

Wikipedia, “Virtual Extensible LAN,” Apr. 19, 2023, <https://en.wikipedia.org/w/index.php?title=Virtual_Extensible_LAN&oldid=1150663730>, 3 pages.

Cisco, “VXLAN BGP EVPN based Multi-Site”, BRKDCN-2035, 2020, 121 Pages.

Cisco, “VXLAN EVPN Multi-Site Design and Deployment”, White paper Cisco public, 2022, 57 pages.

E. Rosen, “IANA Registries for BGP Extended Communities”, Cisco Systems, Inc., Mar. 2014, 16 pages.

E. Rosen, “IANA Registries for BGP Extended Communities”, Internet Engineering Task Force (IETF), Request for Comments: 7153, Mar. 2014, 16 pages.

Hewlett Packard Enterprise Development LP, “VRRP timers”, 2017, web page, <techhub.hpe.com>, 1 page.

Hpe, “VRRP timers”, available online at <https://techhub.hpe.com/eginfolib/networking/docs/switches/7900/5200-0974a_hi-avail_cg/content/485817874.htm>, 201602917, 1 page.

Huawei Technologies Co., Ltd., “Example for Configuring VRRP over VXLAN with Inter-DC Master and Backup Gateways,” Oct. 21, 2021, CloudEngine 16800, 12800, 9800, 8800, 7800, 6800, and 5800 Series Switches Typical Configuration Examples (V100 and V200), <https://web.archive.org/web/20221206214223/https://support.huawei.com/enterprise/en/doc/EDOC1000039339/ebe9e3da/example-for-configuring-vrrp-over-vxlan-with-inter-dc-master-and-backup-gateways>, pp. 1-16.

Huawei, “CloudEngine 16800, 12800, 9800, 8800, 7800, 6800, and 5800 Series Switches: Typical Configuration Examples (V100 and V200),” Mar. 6, 2023, <https://support.huawei.com/enterprise/en/doc/EDOC1000039339/ebe9e3da/example-for-configuring-vrrp-over-vxlan-with-inter-dc-master-and-backup-gateways>, 450 pages.

Rabadan et al., “EVPN Multi-Homing Extensions for Split Horizon Filtering draft-nr-bess-evpn-mh-split-horizon-03”, Sep. 9, 2020, 15 pages.

Sajassi et al., “BGP MPLS-Based Ethernet VPN”, Request for Comments: 7432, Feb. 2015, 56 pages.

Sajassi et al., “BGP MPLS-Based Ethernet VPN”, Internet Engineering Task Force (IETF), Request for Comments: 7432, Feb. 2015, 56 pages.

Sajassi et al., “Ethernet-Tree (E-Tree) Support in Ethernet VPN (EVPN) and Provider Backbone Bridging EVPN (PBB-EVPN)”, Request for Comments: 8317, Jan. 2018, 23 0ages.

Sangli et al., “BGP Extended Communities Attribute”, Internet Engineering Task Force (IETF), Request for Comments: 4360, 2006, 12 Pages.

Sangli et al., “BGP Extended Communities Attribute”, Request for Comments: 4360, Feb. 2006, 12 pages.

* cited by examiner

FINE-GRAINED ROLE-BASED SEGMENTATION IN OVERLAY NETWORK

BACKGROUND

Communications networks can be composed of several types of technologies or layers. For example, a heterogeneous multi-layer network, such as an overlay network, can be formed based on tunneling and a virtual private network (VPN), such as an Ethernet VPN (EVPN). In some examples, the switches in the overlay network can be coupled to each other via a set of tunnels (e.g., virtual extensible local area networks (VXLANs)).

BRIEF DESCRIPTION OF THE FIGURES

In the figures, like reference numerals refer to the same figure elements.

DETAILED DESCRIPTION

Figure 1A:
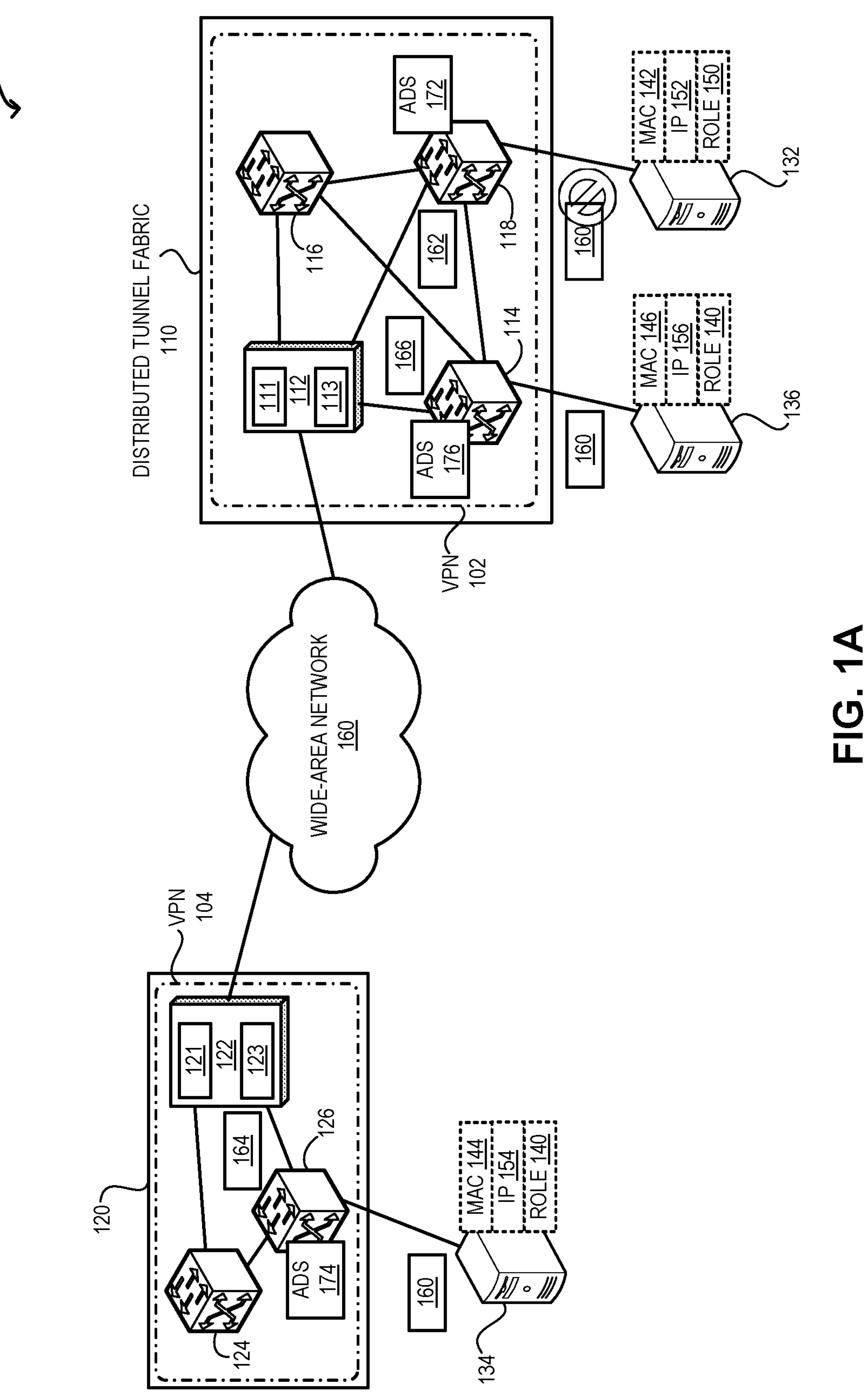
FIG. 1A illustrates an example of an overlay network facilitating fine-grained role-based traffic segmentation, in accordance with an aspect of the present application.

The present disclosure relates to a method and system for efficiently enforcing fine-grained (e.g., at the level of network addresses) role-based traffic segmentation in a distributed tunnel fabric. As noted above, a heterogeneous multi-layer network, such as an overlay network, can be formed based on tunneling and a VPN. The switches in the overlay network can be coupled to each other via a set of tunnels, such as VXLANs. The overlay routing for the VPN over the tunnels can be determined using a routing protocol, such as Border Gateway Protocol (BGP). To deploy a VPN over the tunnels, a respective tunnel endpoint may map a respective client virtual local area network (VLAN) to a corresponding tunnel network identifier (TNI), which can identify a virtual network for a tunnel. When a switch in the fabric learns an address, the switch can share the address with other switches via a fabric route packet (e.g., an EVPN Network Layer reachability information (NLRI)).

The TNI may appear in a tunnel header that encapsulates the fabric route packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric. Since the fabric is an overlay network, a respective switch in the fabric can be a tunnel endpoint of one or more tunnels. Furthermore, a gateway switch of the fabric can be a virtual gateway switch (VGS) shared among a plurality of participating switches.

Role-based segmentation can facilitate the separation of traffic in a network based on roles (e.g., a guest is not allowed to communicate with an engineer). Typically, the definitions of the roles in the network and the policies controlling the inter-role traffic are maintained at the switches coupling the end devices. A respective end device, such as hosts and servers, can be coupled to the overlay network via an access switch. To enforce role-based segmentation, a respective access switch needs to be aware of the role of other end devices. However, in a multi-fabric network, the synchronization of the roles of end devices may not be uniformly supported. As a result, efficiently segmenting traffic in the overlay network can be challenging.

The aspects described herein address the problem of efficiently managing roles and enforcing associated segmentation in an overlay network by (i) including role information of end devices in the fabric route packets for sharing the respective network addresses of the end devices; and (ii) maintaining the role information in association with the network address in a local data structure of a respective switch. Upon learning the network address of an end device from a local port, the switch can discover the role of the end device. The switch can then include the role information (e.g., an identifier associated with the role) in the fabric route packet for sharing the network address. A respective switch learning the network address can then store the role in association with the network address. In this way, the role can be distributed and maintained in a fine-grained way at the level of network addresses.

A distributed tunnel fabric in an overlay network can be coupled to other networks via the gateway switch, which can include a VGS, of the fabric. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-switch link (ISL). The VGS can be associated with one or more virtual network addresses (e.g., a virtual Internet Protocol (IP) address and/or a virtual media access control (MAC) address). A respective tunnel formed at the VGS can use the virtual address to form the tunnel endpoint. As a result, other tunnel endpoints (i.e., other switches) of the fabric can consider the VGS as the other tunnel endpoint for a tunnel instead of any of the participating switches.

To forward traffic toward the VGS, a respective switch in the fabric can perform a load balancing operation (e.g., based on hashing on a respective packet) and select one of the participating switches as the destination (i.e., as the other tunnel endpoint). The switch can then forward the packet via a tunnel between the tunnel endpoints. Hence, an endpoint may forward a multicast control packet to one of the participating switches, which in turn, can share the control packet with a peer participating switch via the ISL. If the fabric is a multi-fabric network, the fabric can be one of a plurality of fabrics forming the network. A respective fabric can then include a gateway switch, which can include a VGS, that can be coupled to a remote gateway switch of another fabric, an external network, or both.

For example, the gateway switch can be coupled to the remote gateway switch via an inter-fabric tunnel (i.e., a tunnel coupling two fabrics). A packet received at the gateway switch via an intra-fabric tunnel (i.e., a tunnel within a fabric) can be encapsulated with a tunnel header associated with the intra-fabric tunnel. The gateway switch can decapsulate the tunnel header and re-encapsulate the packet with another tunnel header associated with the inter-fabric tunnel. A respective switch operating as a tunnel endpoint in the fabric can use a routing protocol, such as BGP. In a multi-fabric overlay network, routes for intra-fabric tunnels can be determined by using internal BGP (iBGP), while the routes for inter-fabric tunnels can be determined by using external BGP (eBGP).

In the overlay network, the role of a user can indicate a set of privileges and a set of resources that the user can access in the overlay network. Hence, the role can indicate the level of access granted to an end device of the user in the overlay network. Depending on the employment at an enterprise, the user can be associated with a role. For example, an engineer and an accountant of an enterprise can be associated with the roles of an "engineer" and an "accountant," respectively. Role-based segmentation can facilitate the segmentation of traffic based on roles. As a result, a user with a role of a "guest" may not be allowed to communicate with a user with a role of an "engineer." When an end device of a user is authenticated with the credentials of the user, the end device becomes associated with the role of the user and allocated to a virtual local area network (VLAN) corresponding to the role. In a multi-fabric overlay network, an access (or edge) switch can determine the role of the end device from the VLAN.

With existing technologies, the access switches can maintain a set of segmentation policies. A respective policy can indicate whether devices associated with one role are allowed to communicate with devices associated with another role. In other words, a respective policy can indicate which role pair is allowed to communicate with each other. Hence, the policies can control inter-role traffic in the overlay network. The policies can be defined by a user (e.g., a network administrator) at a management server, which in turn, can provide the definitions to the access switches. When an end device is coupled to the overlay network, the corresponding access switch can learn the role of the end device and enforce the segmentation based on the policies.

A source switch coupling a source end device can receive a data packet from the source via a local port. The source switch can include the role information, such as a role identifier or role tag, associated with the source end device into the encapsulation header of the data packet. For example, the source switch can use a Group Policy Option (GPO) tag of the tunnel encapsulation header to include the role identifier. The role information is propagated to a respective encapsulation header until the data packet reaches the destination switch coupling the destination end device. Upon receiving the packet, the destination switch can obtain the role information of the source end device from the encapsulation header. By comparing the role information of the source and destination end devices with the policies, the destination switch can determine whether the destination end device is allowed to receive traffic from the source end device.

Therefore, to enforce role-based segmentation, the destination switch needs to be aware of the role information of the requesting host and the policies associated with it. Accordingly, the role information of a respective end device needs to be distributed among the access switches of the overlay network. If the overlay network includes multiple fabrics, distributing the role information among all access switches can be challenging. Without the distribution of the role information, if an end device moves to a different fabric, the user may need to re-authenticate, which can cause disruption of ongoing operations, such as collaborations and meetings. Furthermore, if the VLAN associated with the role is not configured at the new access switch, the end device may not be able to move to that access switch. Consequently, a respective access switch may need to program a large number of policies for all roles in the forwarding hardware, even though the switch may not couple end devices associated with several roles.

To address this problem, role-based segmentation can be deployed at the granularity of a network address, such as MAC or IP addresses, of the end devices. When a switch in the overlay network learns the network address of the end device, the switch can store the role identifier of the role associated with the end device in a local address data structure (ADS). If the network address is a MAC address, the ADS can be the MAC learning table stored in the content-addressable memory (CAM). In this way, the switch can maintain the role information at the level of the network address. Subsequently, the switch can distribute the role information, which can include a role identifier that can uniquely identify the role in the overlay network, to other switches (e.g., tunnel endpoints) of the overlay network. When a remote switch learns the MAC address based on the distribution, the remote switch can obtain the role information and store the role information in the local ADS.

Typically, in the overlay network, when a switch learns the MAC address of an end device, the switch can share the learned MAC address with other switches via a route update. The route update can be incorporated into a fabric route packet, which can be a route update packet, and distributed to a respective other switch (i.e., tunnel endpoint) of the overlay network. Because the role information can be maintained at the granularity of a network address, such as a MAC address, the switch can include the role information in association with the MAC address in the fabric route packet. An existing type of fabric route packet, such as an EVPN route update type 2, can include an additional field to include the role information. Alternatively, the switch may use a new route update type (e.g., a type "X") to distribute the role information. Using the new route update type, the switch can share the role information at the granularity of the MAC address without incorporating other network attributes, thereby reducing the overhead of the distribution. The new route update type may also support additional information associated with the role. For example, the fabric route packet can include the policy identifiers associated with the role.

If the end device migrates to a new access switch, the switch can already be aware of the role of the end device based on the role information shared by the original switch. For example, if the end device is a virtual machine (VM), the migration can correspond to a VM migration to a new host coupling the switch. As a result, when the switch determines the role associated with the end device, the switch can apply the policies and privileges associated with the role without the re-authentication of the end device. In other words, the switch can facilitate a level of access indicated by the role to the end device. This allows the end device to receive ongoing data flow without interruption. In this way, roles associated with respective MAC addresses can ensure efficient enforcement of the role-based segmentation in the overlay network.

Prior to the discovery of the end device, if the role is not associated with the locally coupled end devices, the switch may not program the policies associated with the role. The switch can then obtain the policies associated with the role from a policy repository and program them in the local forwarding hardware. The repository can be a local repository (e.g., a switch database) maintained in the software of the switch or a remote device (e.g., a cloud-based server). Alternatively, if the policies are not locally programmed, the switch may prevent the end device from being coupled to the switch. In some examples, a respective recipient switch of the fabric route packet can map a set of associated policy identifiers to the corresponding role identifier in a role data structure (RDS). When an end device associated with the role becomes coupled to the switch, the switch can identify the policies from the RDS.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of an overlay network facilitating fine-grained role-based traffic segmentation, in accordance with an aspect of the present application. An overlay network 100 can include a number of switches and devices, and may include heterogeneous network components, such as layer-2 and layer-3 hops and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a plurality of distributed tunnel fabrics 110 and 120. Hence, network 100 can be a multi-fabric network. Fabric 110 can include switches 111, 113, 114, 116, and 118, and fabric 120 can include switches 121, 123, 124, and 126. A respective switch in a respective fabric can be associated with a MAC address and an IP address. In a respective fabric of network 100, switches can be coupled to each other via a tunnel.

In FIG. 1A, a respective link denoted with a solid line between a switch pair can indicate a tunnel. Switches of a respective fabric in network 100 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a BGP peer. A VPN 102, such as an Ethernet VPN (EVPN), can be deployed over fabric 110. Similarly, a VPN 104 can be deployed over fabric 120.

A VGS 112 can operate as the gateway switch of fabric 110 and facilitate external communication of fabric 110. In fabric 110, switches 111 and 113 can operate as a single switch in conjunction with each other to facilitate VGS 112. Similarly, VGS 122 can operate as the gateway switch of fabric 120 and facilitate external communication of fabric 120. In fabric 120, switches 121 and 123 can operate as a single switch in conjunction with each other to facilitate VGS 122. VGS 112 and 122 can couple fabrics 110 and 120, respectively, to a wide-area network (WAN) 160, such as an enterprise network or the Internet.

In fabric 110, switches 111 and 113 can operate as a single switch in conjunction with each other to facilitate VGS 112. VGS 112 can be associated with one or more virtual addresses (e.g., a virtual IP address and/or a virtual MAC address). A respective tunnel formed at VGS 112 can use the virtual address to form the tunnel endpoint. To efficiently manage data forwarding, switches 111 and 113 can maintain an ISL between them for sharing control and/or data packets. The ISL can be a layer-2 or layer-3 connection that allows data forwarding between switches 111 and 113. The ISL can also be based on a tunnel between switches 111 and 113 (e.g., a VXLAN tunnel).

Because the virtual address of VGS 102 is associated with both switches 111 and 113, other tunnel endpoints, such as switches 114, 116, and 118, of fabric 110 can consider VGS 112 as the other tunnel endpoint for a tunnel instead of switches 111 and 113. To forward traffic toward VGS 112 in fabric 110, a remote switch, such as switch 114, 116, or 118, can operate as a tunnel endpoint, while VGS 112 can be the other tunnel endpoint. From a respective remote switch of fabric 110, there can be a set of paths (e.g., equal-cost multiple paths or ECMP) to VGS 112. For example, the ECMP can include a path to switch 111 and another path to switch 113. Hence, a respective path in the underlying network can lead to one of the participating switches of VGS 112.

In network 100, VGS 112 can be coupled to VGS 122 via an inter-fabric tunnel (i.e., a tunnel coupling fabrics 110 and 120). A packet between fabrics 110 and 120 can be received at VGS 112 via an intra-fabric tunnel within fabric 110 and can be encapsulated with a tunnel header associated with the intra-fabric tunnel. VGS 112 can decapsulate the tunnel header and re-encapsulate the packet with another tunnel header associated with the inter-fabric tunnel. Upon receiving the packet, VGS 122 can decapsulate the tunnel header and re-encapsulate the packet with another tunnel header associated with the intra-fabric tunnel to send the packet to the intended recipient. To facilitate the forwarding of the packet, VGS 112 can determine routes for intra-fabric tunnels using iBGP and routes for inter-fabric tunnels using eBGP.

In network 100, end devices 132 and 136 are coupled to switches 118 and 114 of fabric 110, respectively, and end device 134 is coupled to switch 126 of fabric 120. End devices 132, 134, and 136 can be associated with MAC addresses 142, 144, and 146, respectively. Furthermore, IP addresses 152, 154, and 156 can be allocated to end devices 132, 134, and 136, respectively. End devices 134 and 136 can be associated with a role 140, which can indicate the privileges and resources accessible by end devices 134 and 136 in network 100. On the other hand, end device 132 can be associated with a role 150, which can indicate the privileges and resources accessible by end device 132 in network 100.

Role-based segmentation can facilitate the segmentation of traffic based on roles. Traffic segmentation can be defined in a set of segmentation policies. One such policy may indicate that an end device with role 140 may not be allowed to communicate with an end device with role 150. When end devices 132, 134, and 136 are authenticated with respective credentials, they can be allocated to respective VLANs corresponding to roles 140 and 150. With existing technologies, switches 114, 118, and 126 can maintain the segmentation policies that can control inter-role traffic in network 100. The policies can be defined by an administrator at a management server, which in turn, can provide the definitions to switches 114, 118, and 126. These switches can then enforce the role-based segmentation in network 100.

Therefore, to enforce role-based segmentation, switches 114, 118, and 126 need to be aware of the role information of end devices 132, 134, and 136 and the policies associated with it. Since network 100 includes multiple fabrics 110 and 120, distributing the role information among switches 114, 118, and 126 can be challenging. Without the distribution of the role information, if end device 132 moves from fabric 110 to fabric 120, end device 132 may need to re-authenticate, which can cause disruption of ongoing operations, such as collaborations and meetings. Furthermore, if the VLAN associated with role 150 is not configured at the new access switch of fabric 120, end device 132 may not be able to move to that switch. Consequently, each access switch of both fabrics 110 and 120 may need to program a large number of policies for all roles in the forwarding hardware, which may strain the limited hardware resources of the switches.

To address this problem, network 100 can maintain and distribute role information at the granularity of a network address. When switch 118 learns MAC address 142, switch 118 can also discover that role 150 is allocated for end device 132. To discover role 150, switch 118 may determine the VLAN configured for end device 132 and determine the role associated with the VLAN. Switch 118 can then store role 150 in association with MAC address 142 in a local ADS 172. ADS 172 can be the MAC learning table stored in the CAM of switch 132. Storing a role can include storing role information, such as a role identifier, associated with the role. The entry for MAC address 142 in ADS 172 can include an additional column to store role 150. Similarly, when switches 126 and 114 learn MAC addresses 144 and 146, respectively, switches 126 and 114 can discover role 140. Switches 126 and 114 can then store role 140 in association with MAC addresses 144 and 146 in local ADS 174 and ADS 176, respectively. In this way, the switches in network 100 can maintain the role information at the level of MAC addresses.

When switch 118 learns MAC address 142 as a new address, switch 118 can distribute MAC address 142 in network 100 using an fabric route packet 162. Because role 150 is learned and maintained with MAC address 142, switch 118 can include role 150 in packet 162. Fabric route packet 162 may also include respective network addresses and roles associated with other end devices coupled to switch 118, if any. By consolidating the distribution of network addresses and roles into one fabric route packet, switch 118 can decrease the processing overhead associated with fabric route packets. Switch 118 can then encapsulate packet 162 in respective tunnel headers (e.g., VXLAN headers) and forward encapsulated packet 162 via corresponding tunnels. Upon receiving encapsulated packet 162, VGS 112 can decapsulate the tunnel header, re-encapsulate packet 162 with another tunnel header associated with the inter-fabric tunnel, and send encapsulated packet 162 to fabric 120. VGS 122 can then decapsulate the tunnel header and re-encapsulate packet 162 with another tunnel header associated with the intra-fabric tunnel to send encapsulated packet 162 to switches 124 and 126. This allows other switches in network 100 to learn MAC address 142 and role 150 of end device 132.

Similarly, switch 114 can learn MAC address 146 and discover role 140 of end device 136. Switch 114 can then distribute MAC address 146 and role 140 in network 100 using fabric route packet 166. In the same way, switch 126 can learn MAC address 144 and discover role 140 of end device 134. Switch 126 can then distribute MAC address 144 and role 140 in network 100 using a fabric route packet 164. When a remote switch, such as switch 126, receives packet 162, switch 126 can store MAC address 142 and role 150 in ADS 174. In the same way, when a remote switch, such as switch 118, receives packets 164 and 166, switch 118 can store MAC addresses 144 and 146, respectively, and corresponding role 140 in ADS 172. In some examples, a respective recipient switch of packets 162, 164, and 166 can map a set of associated policy identifiers to the corresponding role in an RDS. When an end device associated with the role becomes coupled to the switch, the switch can identify the policies from the RDS.

Because the role information can be maintained at the granularity of a MAC address, packets 162, 164, and 166 can carry the corresponding role information in association with MAC addresses 142, 144, and 146, respectively. Packets 162, 164, and 166 can be based on an existing type of a fabric route packet, such as an EVPN route update type 2. There can then be an additional field in packets 162, 164, and 166 to include the role information. Alternatively, packets 162, 164, and 166 can be based on a new route update type (e.g., a type "X") capable of distributing the role information. Using the new route update type, packets 162, 164, and 166 can incorporate the role information at the granularity of the MAC address without incorporating other network attributes, thereby reducing the overhead of the distribution. Packets 162, 164, and 166 may also support additional information, such as the policy identifiers associated with a role.

During operation, end device 134 can send a packet 160, which can be a unicast or multi-destination packet, to end devices 132 and 136. Switch 126 can receive packet 160 via a local port and encapsulate packet 160 with an encapsulation header. Switch 126 can include role 140 (i.e., a role identifier or role tag of role 140) into the encapsulation header. Switch 126 can use a GPO tag of the tunnel encapsulation header to include role 140. A respective encapsulation header can propagate role 140 until packet 160 reaches the destination switch coupling the destination end device. Upon receiving encapsulated packet 160, switch 114 can obtain the role information of end device 134 from the encapsulation header and the role information of end device 136 from ADS 176. Switch 114 can then determine that both end devices 134 and 136 are associated with the same role 140, and hence, end device 136 is allowed to receive packet 160.

On the other hand, switch 118 can determine that end devices 132 and 134 are associated with roles 150 and 140, respectively. Based on a corresponding policy, switch 118 can determine that end device 132 is not allowed to receive packet 160. Therefore, switch 118 can refrain from forwarding packet 160 to end device 132 and may drop packet 160. In this way, switches 114, 118, and 126 can efficiently discover the respective roles of end devices 132, 134, and 136, and enforce segmentation accordingly. Because the same packet can be used to efficiently distribute learned MAC addresses and role information, packets 162, 164, and 166 can ensure efficient use of bandwidth and fast convergence as fewer numbers (i.e., without duplication) of bytes are processed.

Figure 1B:
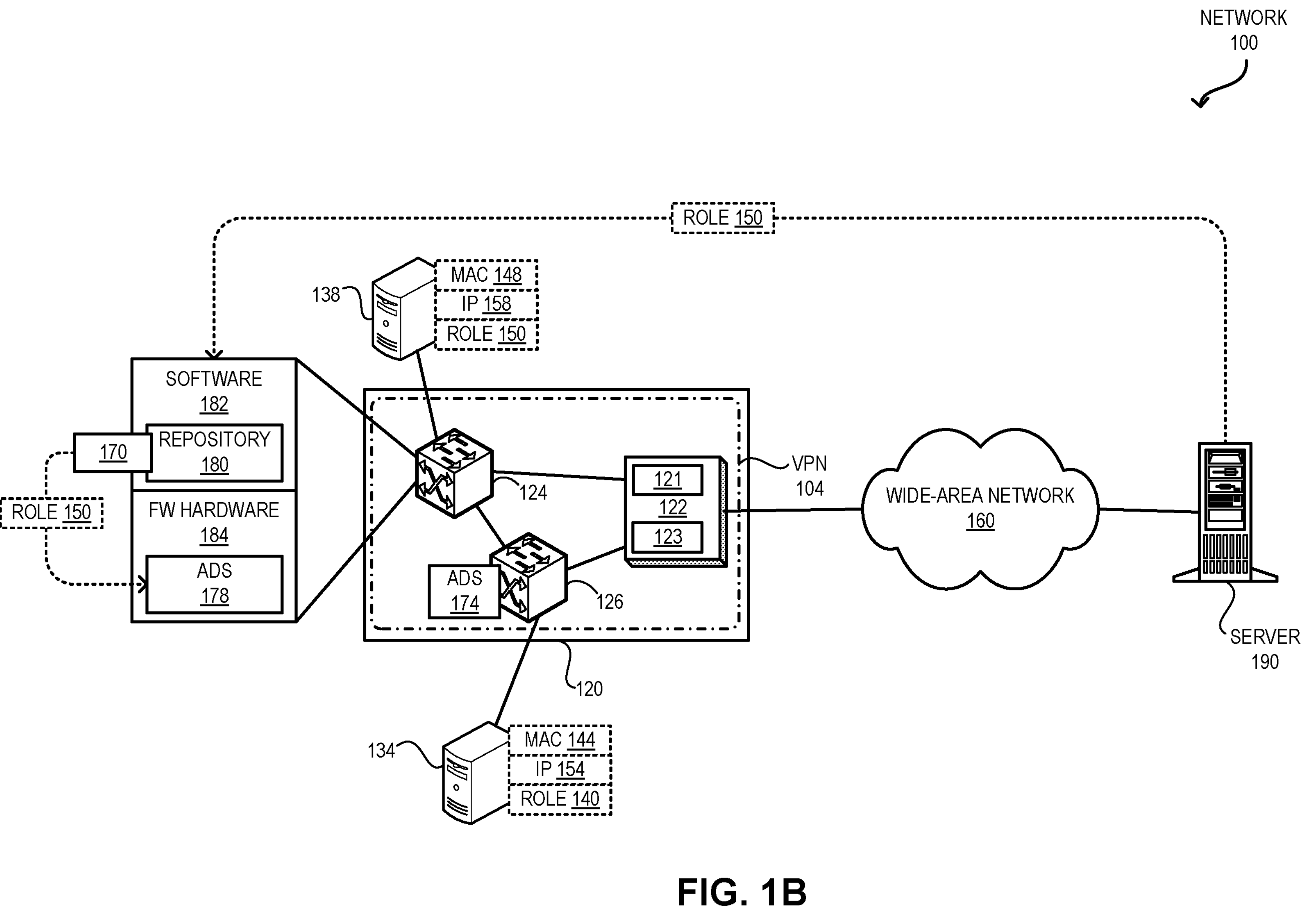
FIG. 1B illustrates an example of a switch in a distributed tunnel fabric efficiently learning policies based on fine-grained role, in accordance with an aspect of the present application.

FIG. 1B illustrates an example of a switch in a distributed tunnel fabric efficiently learning policies based on fine-grained role, in accordance with an aspect of the present application. Suppose that a new end device 138 is coupled with switch 124 of fabric 120. End device 138 can be associated with MAC address 148 and IP address 158. Furthermore, end device 138 can be associated with role 150, which can indicate the privileges and resources accessible by end device 138 in network 100. Prior to the discovery of end device 138, if role 150 is not associated with the locally coupled end devices, switch 124 may not program policies 170 associated with role 150 in forwarding hardware 184 of switch 124. Policies 170 can indicate one or more of: the roles that are allowed to receive traffic from role 150, the roles that are allowed to send traffic to role 150, and role-specific traffic processing instructions. By not programming policies 170 before discovering an end device associated with role 150, switch 124 can ensure efficient utilization of forwarding hardware 184.

Upon discovering end device 138, switch 124 can obtain policies 170 from a policy repository 180 and program policies in forwarding hardware 184. Repository 180 can be a local repository (e.g., a switch database) maintained in software 182 of switch 124. Repository 180 can also be a cloud-based database running on a server 190. Switch 124 can identify a respective policy associated with role 150 in repository 180 to determine policies 170 and retrieve them from repository 180. If retrieved from server 190, switch 124 can store policies 170 in the local instance of repository 180. Alternatively, if policies 170 are not locally programmed, switch 124 may prevent end device 138 from being coupled to switch 124. Switch 124 can then generate an error message for an administrator to indicate that end device 138 is not deployable with switch 124.

Figure 2:
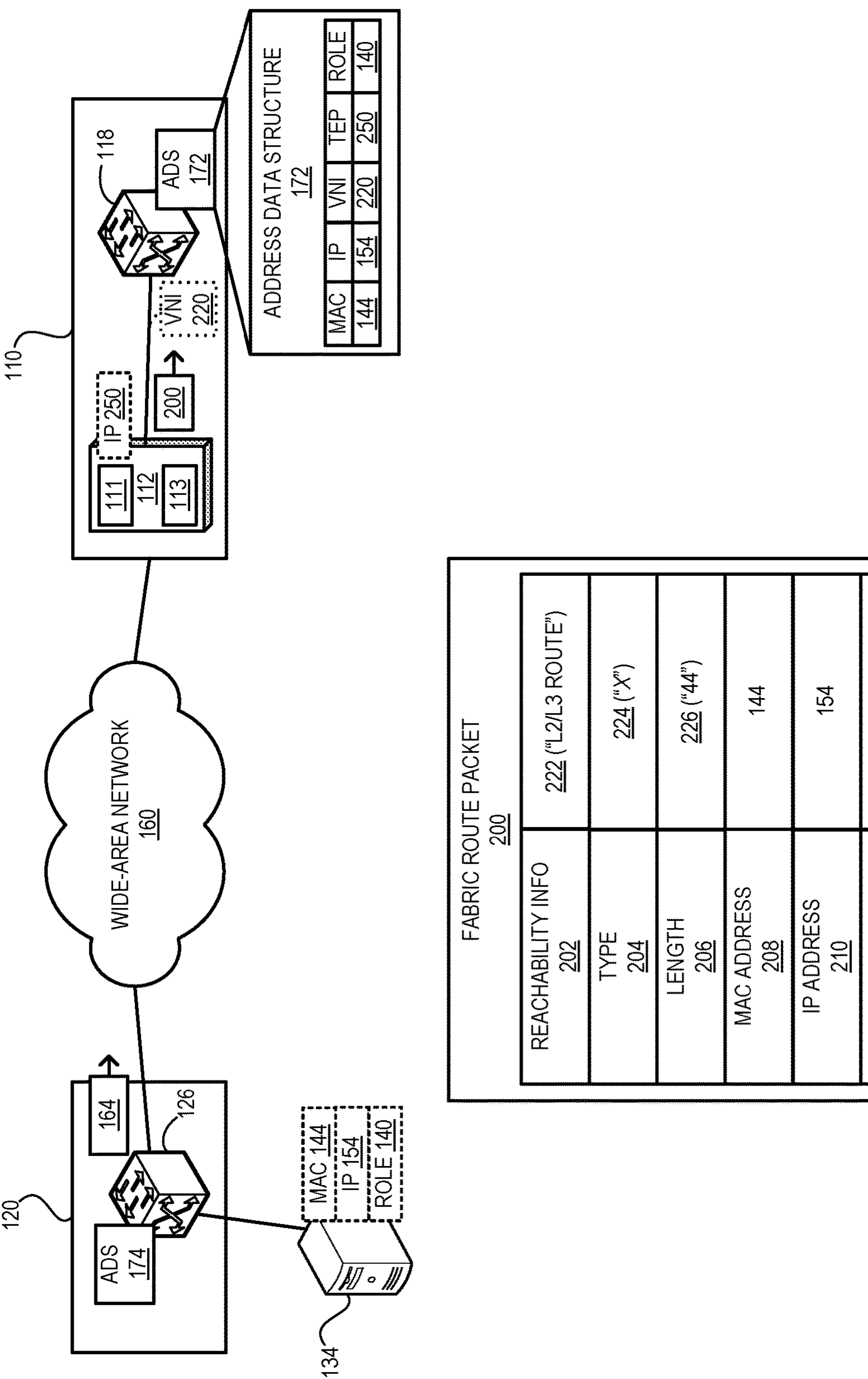
FIG. 2 illustrates an example of a fabric route packet for notifying a role in association with network addresses in an overlay network, in accordance with an aspect of the present application.

FIG. 2 illustrates an example of a fabric route packet for notifying a role in association with network addresses in an overlay network, in accordance with an aspect of the present application. A fabric route packet 200, such as an EVPN type 2 route update or a new type "X" packet, can be used to advertise a role. Hence, packet 200 can be a route update packet that can advertise route updates in a fabric. In this example, packet 200 can be an instance of packet 164 propagated from VGS 112 in fabric 110. Packet 200 can include a reachability information field 202 (i.e., an NLRI field), which can include a value 222 indicating that the reachability information is a layer-2 or layer-3 route. Packet 200 can also include a type field 204, which can include a value 224 indicating the route type 2 or new route type "X." Length field 206 can indicate the length (e.g., the number of bytes) of packet 200.

Packet 200 can include fields 208, 210, and 212 for a MAC address, an IP address, and a VNI. If packet 200 is an instance of packet 164, fields 208 and 210 can include MAC and IP addresses 142 and 152, respectively, of end device 134. Field 212 can include a VNI 220 associated with the VLAN configured for end device 134. VNI 220 can be specific to fabric 110 and can be different for the same VLAN in fabric 120. Since role 140 of end device 134 is learned and maintained at the granularity of MAC address 144, packet 200 can also include a role field 214, which can represent role 140. Accordingly, field 214 can include the identifier of role 140. Packet 200 may also include respective network addresses and roles associated with other end devices coupled to switch 126, if any. Under such circumstances, fields 208, 210, 212, and 214 are repeated for each of the other end devices. This consolidation can decrease the processing overhead associated with fabric route packets.

When switch 118 receives packet 200 from VGS 112, switch 118 can generate an entry in ADS 172 with the information obtained from packet 200. The entry can include MAC address 144, IP address 154, VNI 220, and role 140. The entry can also include IP address 250 of VGS 112 in a column for the tunnel endpoint from which packet 200 has been received. IP address 250 can be the virtual IP address associated with VGS 112. The entry allows switch 118 to forward a packet destined for MAC address 144 to VGS 112. Furthermore, switch 118 can include role 140 in the encapsulation header of the packet based on the entry in ADS 172. In this way, the fined-grained role-based segmentation at the level of a MAC address allows switch 118 to efficiently maintain and utilize role information in network 100.

Figure 3:
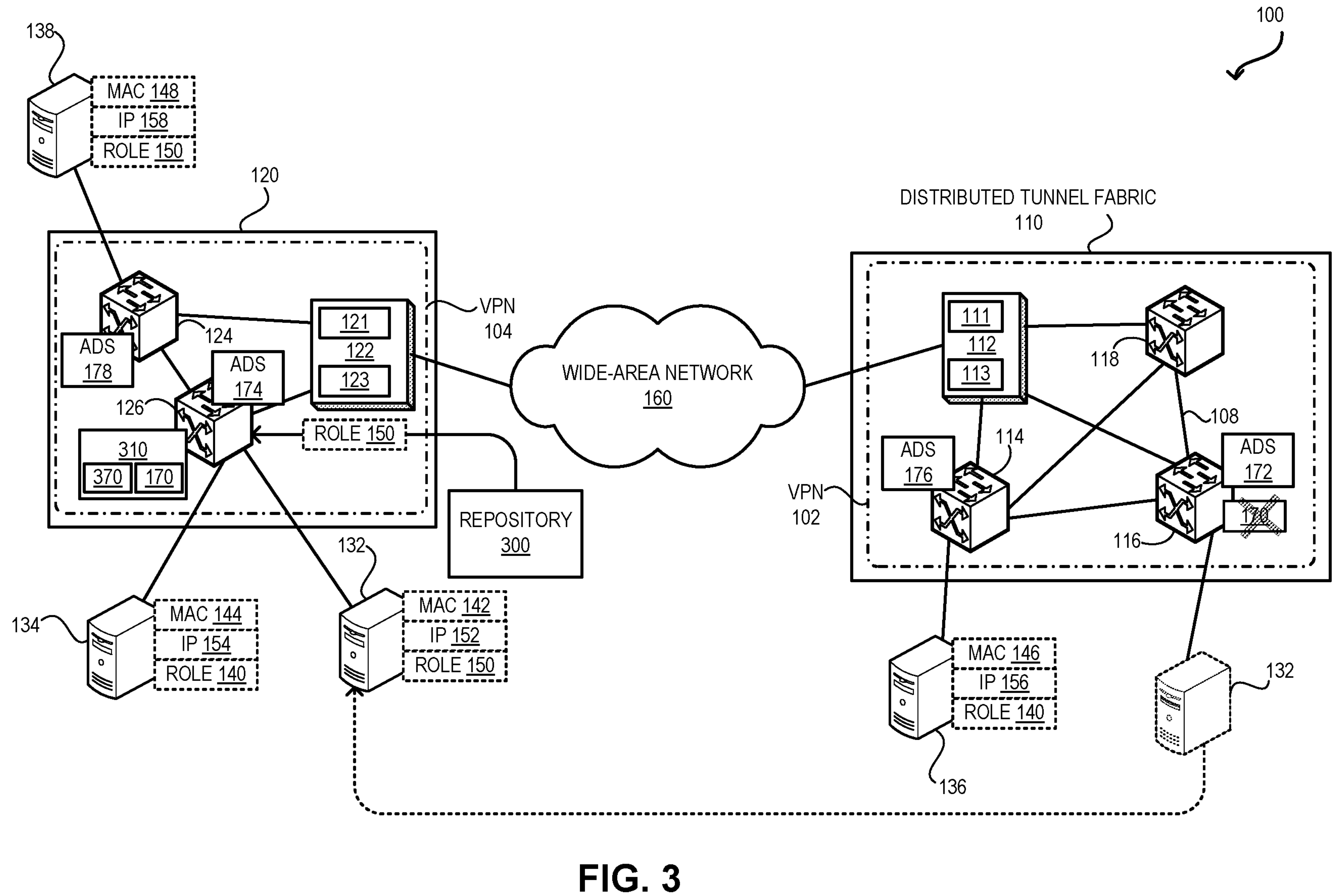
FIG. 3 illustrates an example of fine-grained role discovery for a migrating end device, in accordance with an aspect of the present application.

FIG. 3 illustrates an example of fine-grained role discovery for a migrating end device, in accordance with an aspect of the present application. Suppose that end device 132 migrates from switch 118 to switch 126 (denoted with a dotted arrow). If end device 132 is a VM, the migration can correspond to a VM migration to a new host (not shown in FIG. 3) coupling switch 126. Because switch 118 has shared role 150 of end device 132 with other switches in network 100, switch 126 can already be aware of role 150. As a result, role 150 for end device 132 can be safeguarded at switch 126. Consequently, when switch 126 identifies end device 132 via a local port and learns MAC address 142, switch 126 can determine that end device 132 has already been authenticated and assigned with role 150 and can apply policies 170 associated with role 150 without re-authentication of end device 132. This allows end device 132 to receive ongoing data flow without interruption.

Prior to the discovery of end device 132, forwarding hardware 310 of switch 126 can include policies 370 associated with role 140 because of end device 134. However, forwarding hardware 310 may not include policies 170 associated with role 150. Upon discovering end device 132, switch 126 may obtain policies 170 from a policy repository 300 and program policies in forwarding hardware 310. Repository 300 can be a local repository maintained in the software of switch 126 or a cloud-based database. Switch 126 can identify a respective policy associated with role 150 in repository 300 to determine policies 170 and retrieve them from repository 300. Alternatively, if policies 170 are not locally programmed, switch 126 may prevent end device 132 from migrating to switch 126. Switch 1246 can then generate an error message for an administrator to indicate that end device 132 is not deployable with switch 126.

Figure 4A:
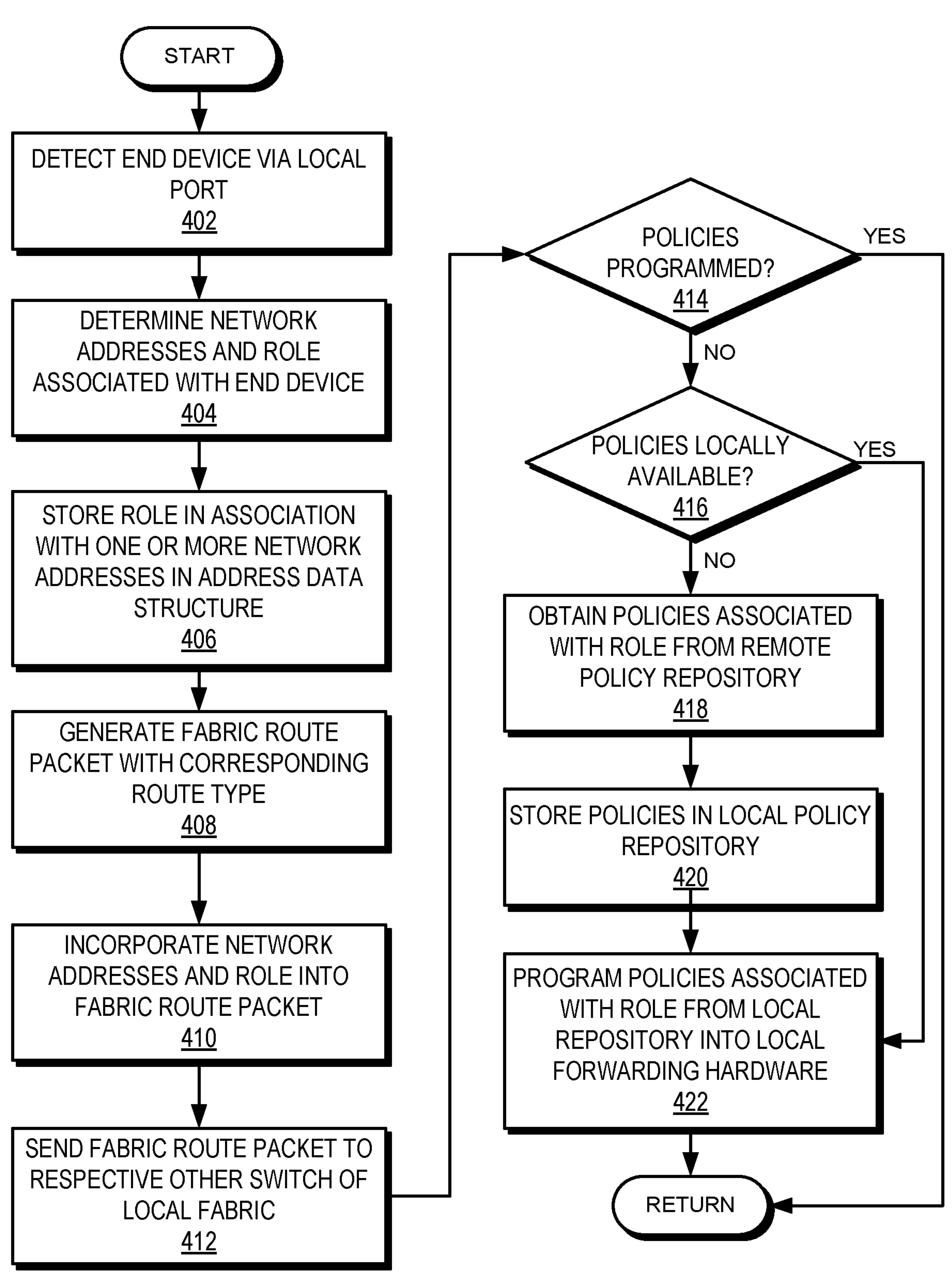
FIG. 4A presents a flowchart illustrating an example of a process of a switch learning a network address and an associated role, in accordance with an aspect of the present application.

FIG. 4A presents a flowchart illustrating an example of a process of a switch learning a network address and an associated role, in accordance with an aspect of the present application. During operation, the switch can detect an end device via a local port (operation 402) and determine the network addresses and the role associated with the end device (operation 404). The switch can store the role in association with one or more network addresses (e.g., a MAC address) in the address data structure (operation 406). The switch can then generate fabric route packet with a corresponding route type (operation 408). The route type can be an EVPN route type 2 or a new route type. The switch can incorporate the network addresses and the role into the fabric route packet (operation 410) and send the fabric route packet to a respective other switch of the local fabric (operation 412).

The switch can also determine whether the policies associated with the role are programmed (operation 414). If the policies are not programmed, the switch can determine whether the policies are locally available (e.g., in a local database) (operation 416). If the policies are not locally available, the switch can obtain the policies associated with the role from a remote policy repository (e.g., from a cloud server) (operation 418) and store the policies in a local policy repository (operation 420). If the policies are locally available (operation 416) or upon storing the policies in the local policy repository (operation 420), the switch can program the policies associated with the role from the local repository into the local forwarding hardware (operation 422).

Figure 4B:
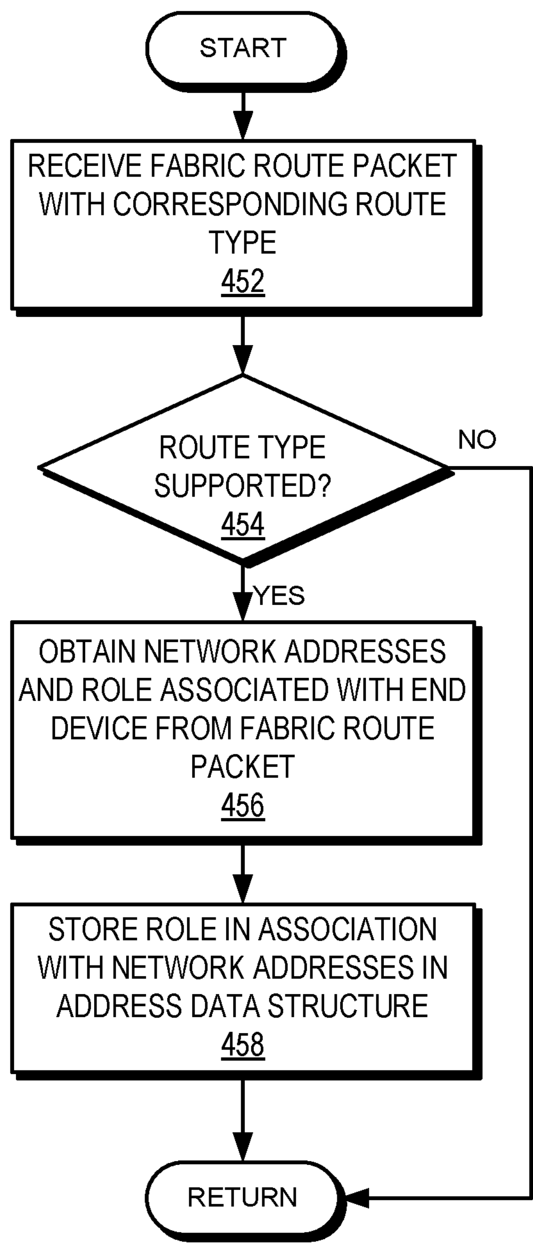
FIG. 4B presents a flowchart illustrating an example of a process of a switch obtaining a remotely learned network address and an associated role, in accordance with an aspect of the present application.

FIG. 4B presents a flowchart illustrating an example of a process of a switch obtaining a remotely learned network address and an associated role, in accordance with an aspect of the present application. During operation, the switch can receive a fabric route packet with a corresponding route type (operation 452). The switch can then determine whether the route type is supported (operation 454). If the route type is supported, the switch can obtain the network addresses and roles associated with an end device from the fabric route packet (operation 456). Subsequently, the switch can store the role in association with the network addresses in the address data structure (operation 458).

Figure 5:
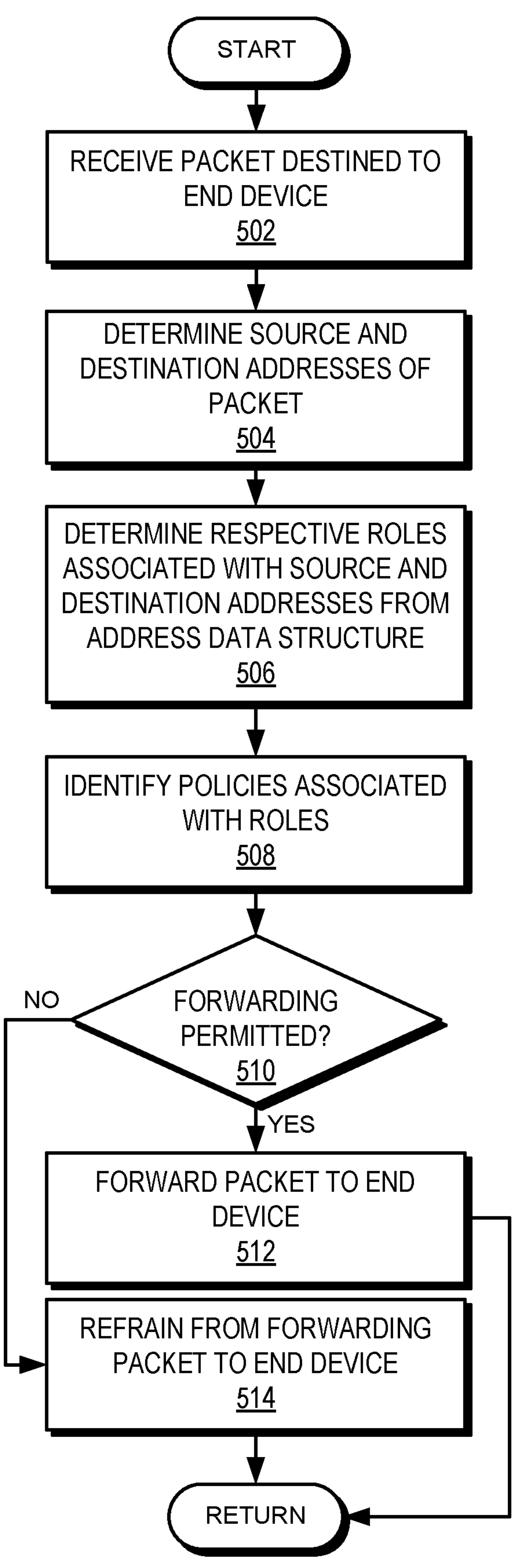
FIG. 5 presents a flowchart illustrating an example of a process of a switch facilitating fine-grained role-based traffic segmentation, in accordance with an aspect of the present application.

FIG. 5 presents a flowchart illustrating an example of a process of a switch facilitating fine-grained role-based traffic segmentation, in accordance with an aspect of the present application. During operation, the switch can receive a packet destined to an end device (operation 502). The packet can also be a multi-destination packet to be forwarded via the port coupling the end device. The switch can determine the source and destination addresses of the packet (operation 504). The switch can then determine respective roles associated with the source and destination addresses from the address data structure (operation 506).

Subsequently, the switch can identify policies associated with the roles (operation 508) and determine whether forwarding is permitted based on the policies (operation 510). If forwarding is permitted, the switch can forward the packet to the end device (operation 512). On the other hand, if forwarding is not permitted, the switch can refrain from forwarding the packet to the end device (operation 514). The switch may also drop the packet. This traffic segmentation process can be performed at the forwarding hardware of the switch.

Figure 6:
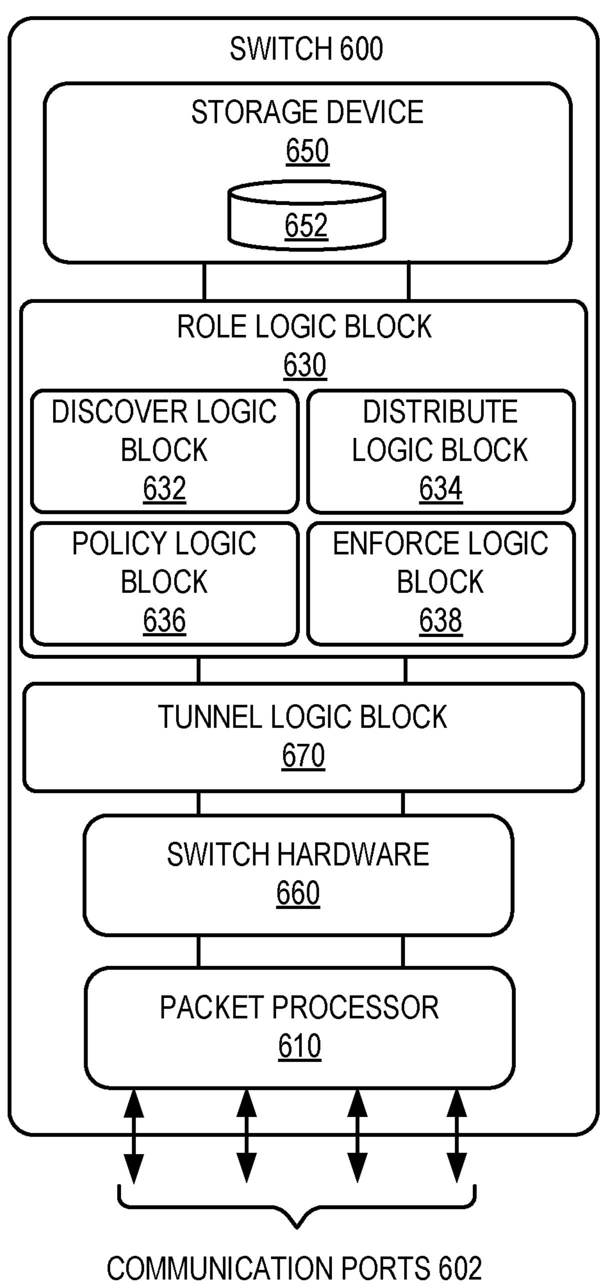
FIG. 6 illustrates an example of a switch supporting fine-grained role-based traffic segmentation, in accordance with an aspect of the present application.

FIG. 6 illustrates an example of a switch supporting fine-grained role-based traffic segmentation, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with the routing, configuration, and interfaces of switch 600. Database 652 may store the routing data structure (e.g., an RIB), an ADS, a policy repository, and an RDS for switch 600. Switch 600 can include a tunnel logic block 670 that can establish a tunnel with a remote switch in an overlay network, thereby allowing switch 600 to operate as a tunnel endpoint. Switch 600 can include a role logic block 630 that can allow switch 600 to facilitate fine-grained role-based traffic segmentation. Role logic block 630 can include a discover logic block 632, a distribute logic block 634, a policy logic block 636, and an enforce logic block 638.

Discover logic block 632 can detect a locally coupled end device, learn the network addresses of the end devices, and discover the role of the end device. Distribute logic block 634 can incorporate the role in association with the network addresses in a fabric route packet and distribute the packet to a respective other switch of the local fabric. Policy logic block 636 can determine policies associated with a role. If the policies are not locally programmed, policy logic block 636 can obtain the policies from a repository and program them in switch hardware 660. Enforce logic block 636 can determine whether to forward a packet to an end device based on the policies associated with the respective roles of the source and destination of the packet.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for facilitating segmentation by a first switch of an overlay tunnel fabric. During operation, the system can receive a route update packet for the overlay tunnel fabric. The route update packet can be based on a control plane that allows the exchange of route information via the tunnel and can include a first media access control (MAC) address learned at a second switch and a first role identifier of a first role associated with the first MAC address. The role can indicate the level of access granted to a first device associated with the first MAC address in the overlay tunnel fabric. The system can store the first MAC address and the first role identifier in a local address data structure. The system can receive a packet from the first device, wherein the packet is destined to a local device. The system can then determine, based on the first role identifier and a first segmentation policy, whether the local device is allowed to receive the packet from the first device. The first segmentation policy can be associated with the respective roles of the first and local devices.

In a variation on this aspect, the route update packet can also include an Internet Protocol (IP) address of the first device and a virtual network identifier (VNI) associated with a virtual local area network (VLAN) of the first device.

In a further variation, the system can store the IP address, the VNI, and an address of a remote tunnel endpoint of the tunnel in association with the first MAC address in the address data structure.

In a variation on this aspect, the address data structure can be a MAC address learning table stored in the forwarding hardware of the first switch.

In a variation on this aspect, the system can learn the first MAC address via a local port and determine the first role associated with the first MAC address from the address data structure. The system can then allow the first device to communicate with the overlay tunnel fabric via the first switch, thereby bypassing the reauthentication of the first device.

In a variation on this aspect, the system can learn a second MAC address and a second role identifier of a second device via a local port. The system can then determine whether a second segmentation policy associated with the second role identifier is locally configured. If the second segmentation policy is not locally configured, the system can perform a corrective action for the second device.

In a further variation, the corrective action for the second device can include one of: retrieving the second policy from a policy repository and locally configuring the second policy; and preventing the second device from communicating with the overlay tunnel fabric via the first switch.

In a variation on this aspect, the control plane is based on an Ethernet virtual private network (EVPN). The route update packet can then be one of: an EVPN route type 2 and an EVPN Network Layer reachability information (NLRI) of a new type for sharing information associated with a role.

In a variation on this aspect, the route update packet can also include a plurality of MAC addresses that includes the first MAC addresses and respective role identifiers associated with the plurality of MAC addresses.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:

receiving, by a first switch of an overlay tunnel fabric, a route update packet, wherein the route update packet comprises a first media access control (MAC) address learned at a second switch and a first role identifier of a first role associated with the first MAC address, wherein the first role indicates a level of access granted to a first device associated with the first MAC address in the overlay tunnel fabric, and wherein the route update packet is based on a control plane that allows exchange of route information via a tunnel;

storing, by the first switch, the first MAC address and the first role identifier in a local address data structure;

receiving, by the first switch, a packet from the first device, wherein the packet is destined to a local device; and determining, based on the first role identifier and a first segmentation policy, whether the local device is allowed to receive the packet from the first device, wherein the first segmentation policy is associated with respective roles of the first and local devices.

2. The method of claim 1, wherein the route update packet further comprises an Internet Protocol (IP) address of the first device and a virtual network identifier (VNI) associated with a virtual local area network (VLAN) of the first device.

3. The method of claim 2, further comprising storing the IP address, the VNI, and an address of a remote tunnel endpoint of the tunnel in association with the first MAC address in the local address data structure.

4. The method of claim 1, wherein the local address data structure comprises a MAC address learning table stored in forwarding hardware of the first switch.

5. The method of claim 1, further comprising:

learning, by the second switch, the first MAC address via a local port connected to the first device;

discovering, by the second switch, the first role associated with the first MAC address;

adding, by the second switch, the first MAC address and the first role identifier to the route update packet; and sending, by the second switch, the route update packet through a network for receipt by one or more other switches.

6. The method of claim 1, further comprising:

learning, by the first switch, a second MAC address and a second role identifier of a second device via a local port connected to the second device;

determining, by the first switch, whether a second segmentation policy associated with the second role identifier is locally configured at the first switch; and in response to determining that the second segmentation policy is not locally configured at the first switch, performing a corrective action for the second device.

7. The method of claim 6, wherein the corrective action for the second device comprises one of:

retrieving, by the first switch, the second segmentation policy from a policy repository and locally configuring the second segmentation policy at the first switch; or preventing the second device from communicating with the overlay tunnel fabric via the first switch.

8. The method of claim 1, wherein the control plane is based on an Ethernet virtual private network (EVPN), and wherein the route update packet is one of: an EVPN route type 2 or an EVPN Network Layer reachability information (NLRI) of a new type for sharing information associated with a role.

9. The method of claim 1, wherein the route update packet comprises:

a plurality of MAC addresses that includes the first MAC addresses; and respective role identifiers associated with the plurality of MAC addresses.

10. The method of claim 1, wherein the overlay tunnel fabric is a first overlay tunnel fabric, and the first switch receives the packet from the first device after the first device has migrated from a second overlay tunnel fabric comprising the second switch to the first overlay tunnel fabric.

11. The method of claim 10, wherein the route update packet is received at the first switch over the tunnel between a tunnel endpoint in the second overlay tunnel fabric and a tunnel endpoint in the first overlay tunnel fabric.

12. A non-transitory computer-readable storage medium storing instructions that when executed by a processor of a first switch cause the first switch to:

receive, at the first switch of an overlay tunnel fabric, a route update packet, wherein the route update packet comprises a first media access control (MAC) address learned at a second switch and a first role identifier of a first role associated with the first MAC address, wherein the first role indicates a level of access granted to a first device associated with the first MAC address in the overlay tunnel fabric;

store the first MAC address and the first role identifier in an address data structure of the first switch;

receive, at the first switch, a packet from the first device, wherein the packet is destined to a local device in the overlay tunnel fabric; and determine, based on the first role identifier and a first segmentation policy, whether the local device is allowed to receive the packet from the first device, wherein the first segmentation policy is associated with the first role of the first device and a role of the local device.

13. The non-transitory computer-readable storage medium of claim 12, wherein the route update packet further comprises an Internet Protocol (IP) address of the first device and a virtual network identifier (VNI) associated with a virtual local area network (VLAN) to which the first device is connected, and wherein the instructions when executed cause the first switch to:

store the IP address, the VNI, and an address of a remote tunnel endpoint of a tunnel in association with the first MAC address in the address data structure.

14. The non-transitory computer-readable storage medium of claim 13, wherein the overlay tunnel fabric is a first overlay tunnel fabric, and the packet is received at the first switch from the first device after the first device has migrated from a second overlay tunnel fabric comprising the second switch to the first overlay tunnel fabric.

15. The non-transitory computer-readable storage medium of claim 14, wherein the route update packet is received at the first switch over a tunnel between a tunnel endpoint in the second overlay tunnel fabric and a tunnel endpoint in the first overlay tunnel fabric.

16. The non-transitory computer-readable storage medium of claim 12, wherein the instructions when executed cause the first switch to:

learn a second MAC address and a second role identifier of a second device via a local port connected to the second device;

determine whether a second segmentation policy associated with the second role identifier is locally configured at the first switch; and in response to determining that the second segmentation policy is not locally configured at the first switch, perform a corrective action for the second device.

17. The non-transitory computer-readable storage medium of claim 16, wherein the corrective action for the second device comprises one of:

retrieving, by the first switch, the second segmentation policy from a policy repository and locally configuring the second segmentation policy at the first switch; or preventing the second device from communicating with the overlay tunnel fabric via the first switch.

18. The non-transitory computer-readable storage medium of claim 14, wherein the first role identifier for the first device being stored in the address data structure allows the first device to communicate with the overlay tunnel fabric via the first switch without the first device first having to perform reauthentication.

19. A first switch, comprising:

a processor; and a communication port to receive a route update packet in an overlay tunnel fabric, wherein the route update packet comprises a first media access control (MAC) address learned at a second switch and a first role identifier of a first role associated with the first MAC address, wherein the first role indicates a level of access granted to a first device associated with the first MAC address in the overlay tunnel fabric;

wherein the processor is to:

store the first MAC address and the first role identifier in an address data structure of the first switch;

identify a packet received from the first device, wherein the packet is destined to a local device in the overlay tunnel fabric; and determine, based on the first role identifier and a first segmentation policy, whether the local device is allowed to receive the packet from the first device, wherein the first segmentation policy is associated with the first role of the first device and a role of the local device.

20. The first switch of claim 19, wherein the overlay tunnel fabric is a first overlay tunnel fabric, and the packet is received at the first switch from the first device after the first device has migrated from a second overlay tunnel fabric comprising the second switch to the first overlay tunnel fabric.

* * * * *